June 1, 1926.
A. B. HULL
1,586,997
SPRAYING APPARATUS
Filed April 10, 1922
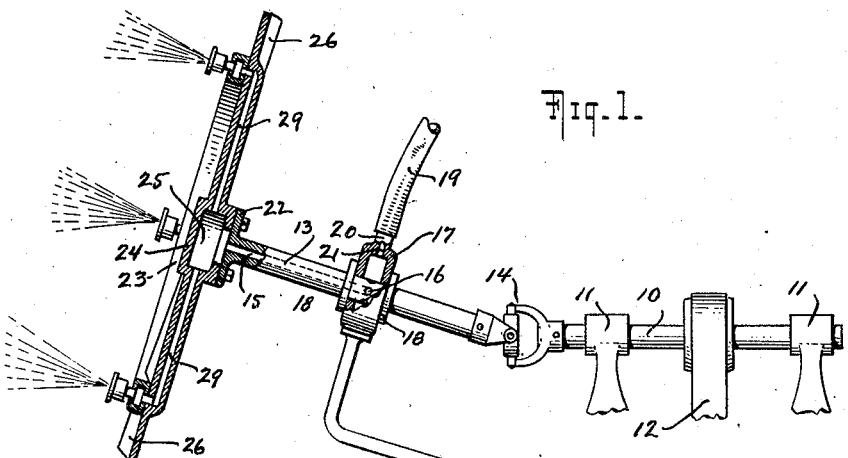
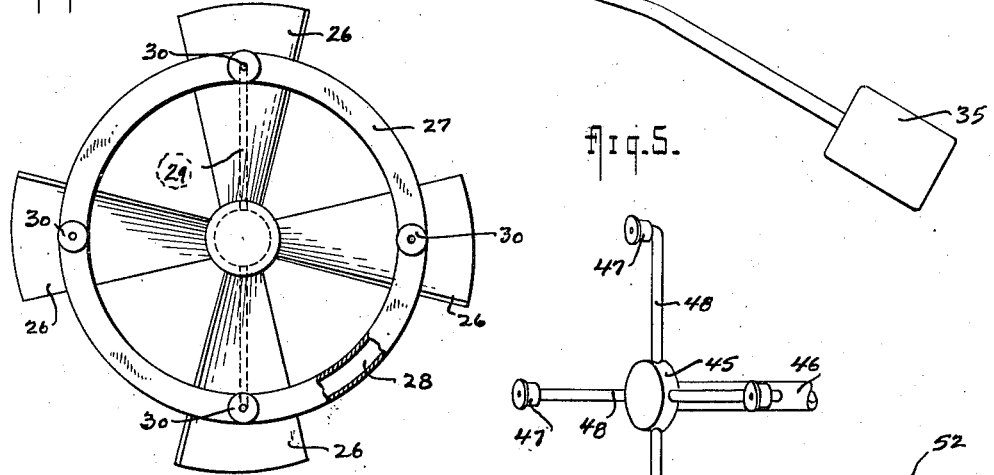
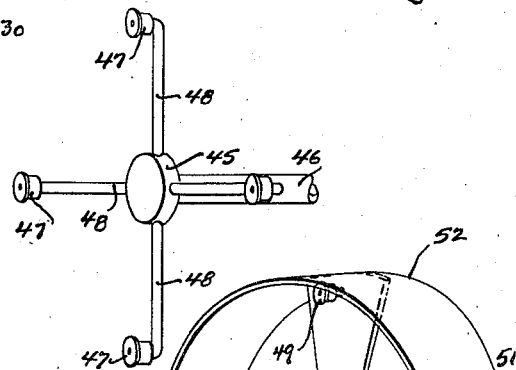
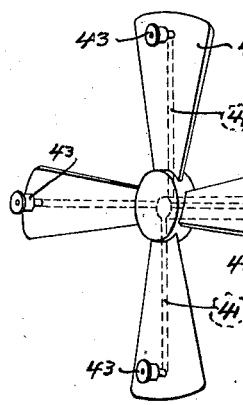
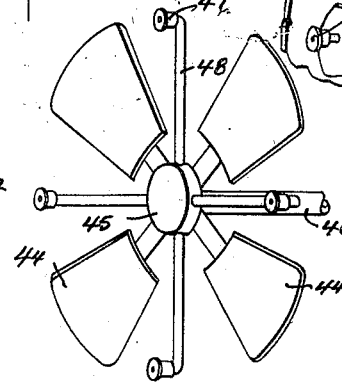
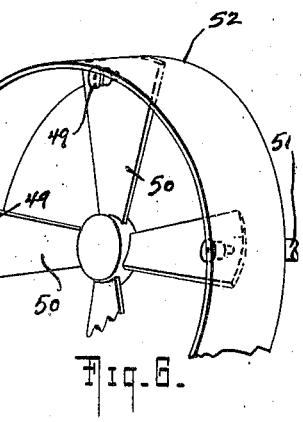
INVENTOR
Arthur B. Hull
BY
ATTORNEY Patented June 1, 1926.

1,586,997

UNITED STATES PATENT OFFICE.

ARTHUR B. HULL, OF GASPORT, NEW YORK.

SPRAYING APPARATUS.

Application filed April 10, 1922. Serial No. 550,949.

My invention relates generally to spraying devices, and more particularly to devices of this nature which are used for spraying insecticides upon foliage.

As is well known to those skilled in the art, the devices used at present for spraying insecticides upon foliage employ a spray gun. This spray gun is provided at its outer end with a spray nozzle, and appliances must be used for creating and maintaining a high pressure upon the insecticide in order that it may be forced from the spray nozzle with sufficient velocity to cause it to be properly atomized. It is well known that such a pressure system is not only expensive to install, but costly to maintain in operation. Furthermore, the spray from such a nozzle is limited to a comparatively small area.

The principal object of my invention has been to provide a device of this nature, in which comparatively low pressures may be used in the insecticide supply pipe, thus dispensing with the costly apparatus necessary to produce and maintain the high pressure of present-day devices.

Another object has been to provide a device which shall be provided with a plurality of spray nozzles, whereby a fog, or finely atomized spray of insecticides may be produced and sprayed over a comparatively large area.

Moreover, my invention contemplates the use of a fan in connection with the spray nozzles, whereby the fog produced by the nozzles may be conveyed and distributed over a widely spread area.

It has also been an object to produce a device in which the spray nozzles shall be located some distance from their axes of rotation, whereby the centrifugal action produced by the passage of the fluid toward the rotating nozzle shall produce the necessary pressure of the fluid at the nozzle.

Furthermore, my invention provides means for adjusting the position of the device so as to direct the flow of fog produced thereby.

Due to the rapid rotation of the nozzles through the air, a slight suction will be produced at the mouths of the nozzles if the axes thereof are coincident with the radial planes extending through the axes of the shaft, or if they lean slightly backwards. This will further assist in increasing the pressure of the insecticide and in atomizing the same which will not be the case if the nozzles lean forwardly.

The above objects and advantages have been accomplished by the device shown in the accompanying drawings of which:

Fig. 1 shows a side elevation of a complete device, partly in section.

Fig. 2 is a face view of the device shown in Fig. 1.

Fig. 3 is a perspective view of a modified form of the device.

Fig. 4 is another form of my device embodying my invention.

Fig. 5 is another modification thereof.

Fig. 6 is still another modified form of my device.

My device comprises in general a centrally arranged hollow shaft through which insecticide is passed, and in communication with the interior of which are connected a plurality of spray nozzles which are arranged at some distance from the center of rotation and communicating with the radiating passageways. The device may be provided either with or without means for causing the circulation of the fog created by the device. It will be understood that the spray nozzles used in my device are of the type that produce a whirling of finely divided and atomized liquid.

Referring to Fig. 1, where I show the preferred embodiment of my invention, 10 represents a power shaft, which is rotatably mounted in standards 11, and driven by a belt 12. A propeller shaft 13 is connected to the power shaft 10 preferably by means of a universal joint 14. The shaft 13 is provided with a central passageway 15 which extends from the outer end thereof through a portion of its length. A plurality of radially arranged apertures 16 are provided at the inner end of the passageway 15 and serve as means of communication to the passageway from the exterior of the shaft. A hollow ring 17 is arranged about the part of the shaft where the apertures 16 are provided, and it is rotatably held in position by any suitable means such as the collars 18. A hose 19 is attached to an extension 20 on the ring, which is provided with an aperture 21, communicating with the interior of the ring, whereby the insecticide is conducted thereto. The outer end of the shaft 13 is preferably provided with a flange 22 to which is secured a fan 23. This fan is provided with a central hub 24 having a recess 25 formed therein, and also with a plurality of blades 26.

A ring 27, having a fluid passageway 28, is made preferably an integral part of the blades 26. Two or more of the blades 26 are provided each with a fluid passageway 29. These passageways are preferably radially arranged and connect the recess 25 in the hub with the annular fluid passageway 28 of the ring. A plurality of spray or atomizing nozzles 30 are arranged at suitable intervals upon the ring 27 and are in communication with the space 28 thereof.

A counterweight 35 is provided for balancing the propeller shaft 13 and the fan 23, and it is suitably connected to the hollow ring 17. This provides means whereby the fan may be moved so as to direct the general course of the fog in any desired direction.

In the form of invention shown in Fig. 3 the fluid ring of the form of Figs. 1 and 2 has been omitted, and each of the fan blades 40 is provided with a radial fluid passageway 41 which connects with the hollow shaft 42 of the fan. A spray nozzle 43 is attached to each of the blades, and is in communication with the outer end of the passageway 41.

In Fig. 4 I have shown a form of invention in which a fan is provided, having blades 44, each attached to a central hub 45, carried by the hollow shaft 46. The fluid is conducted to the nozzles 47 preferably by means of pipes 48, which have their lower ends connected with the hub 45 and in communication with the passageway of the shaft 46.

In Fig. 5 I show a form of invention similar to that in Fig. 4, in which the fan has been omitted. As in Fig. 4, 47 are the spray nozzles which are connected to the hub 45 of the hollow shaft 46 by means of pipes 48.

In Fig. 6 I show a form of fan similar to that shown in Fig. 3, in which the spray nozzles 49 are arranged near the ends of the fan blades 50 and are in open communication with the hollow shaft 51, by means of suitable passageways (not shown). Surrounding the fan, in this form of the invention, is a casing 52. This casing serves to give more positive direction to the flow of the fog produced by the device, and it may be either attached to the outer edges of the blades 50, and rotatable therewith, or it may be a separate part, stationarily arranged and supported around the fan.

The action produced by the different forms of the device herein described is similar, and for convenience I will limit the description of operation to the forms shown in Figs. 1 and 2.

It will be clear that when an insecticide is supplied through the hose 19, under a comparatively slight pressure, the ring 17 will be filled with the insecticide and it will be caused to flow through the apertures 16 into the passageway 15 in the propeller shaft 13 and into the recess 25 of the fan 23. As the fan is rotated at a high velocity, the fluid will be forced outwardly through the apertures 29 and into the ring 28. From here it will pass through the spray nozzles 30 and will be forced with great velocity into the air. As before indicated, it is necessary that the fluid coming from the pipe 19 be under only a comparatively slight pressure, because the centrifugal force produced by the rapidly revolving fan will draw the fluid through the propeller shaft and force it outwardly with sufficient pressure to produce efficient atomization of the fluid. Furthermore, the rapidly rotating nozzles, as they move through the air, produce an air suction on the discharged insecticide which greatly assists in the atomization thereof. Also, this movement of the nozzles through the air produces a suction upon the insecticide which serves to increase the pressure produced by the centrifugal force.

While I have shown the use of a universal joint in Fig. 1, it is obvious that the entire apparatus, with the motive power, may be mounted upon an adjustable platform, and the same result obtained. These and other modifications of the details herein shown and described may be made without departing from the spirit of my invention or the scope of the appended claims.

Having thus described my invention, what I claim is:

1. A spraying apparatus comprising a hollow shaft, forwardly directed radially arranged atomizing nozzles carried by the shaft, means for producing pressure upon the insecticide being sprayed, means for rotating said shaft to create centrifugal action upon the insecticide supplied to said nozzles, and means for universally adjusting the angular position of the apparatus, whereby the atomized liquid is forced in any desired direction.

2. An insecticide spraying apparatus comprising a hollow shaft, a fluid chamber carried by said shaft adjacent one end thereof, radially disposed conduits connected to said fluid chamber and extending beyond said shaft, forwardly directed spray nozzles on the outer ends of said conduits, means for supplying an insecticide to said hollow shaft under low pressure and means for rotating said hollow shaft whereby the insecticide is subject to centrifugal action and sprayed from said nozzles at increased pressure.

3. An insecticide spraying apparatus comprising a hollow shaft, a fluid chamber carried by said shaft adjacent one end thereof, radially disposed conduits connected to said fluid chamber and extending beyond said shaft, forwardly directed spray nozzles on the outer ends of said conduits, fan blades fixed to the hollow shaft and extending parallel with and rearwardly of the plane of the spray nozzles, means for supplying an insecticide to said hollow shaft under low pressure and means for rotating said hollow shaft whereby the insecticide is subject to centrifugal action and sprayed from said nozzles at increased pressure.

In testimony whereof, I have hereunto signed my name.

ARTHUR B. HULL.